United States Patent [19]

Smarook

[11] 4,127,547

[45] Nov. 28, 1978

[54] HYDROGEL DOUGH COMPOSITION FOR FABRICATION OF FOAMED ARTICLES

[75] Inventor: Walter H. Smarook, Somerville, N.J.

[73] Assignee: Union Carbide Corporation, New York, N.Y.

[21] Appl. No.: 536,955

[22] Filed: Dec. 23, 1974

[51] Int. Cl.$^2$ .................... C08J 9/28; C08K 3/20; C08K 5/02; C08L 81/06
[52] U.S. Cl. .................. 521/98; 260/29.2 UA; 260/29.6 NR; 260/29.6 SQ; 260/33.4 R; 260/33.8 R; 264/53; 264/54; 260/29.2 R; 521/180
[58] Field of Search ........... 260/2.5 R, 2.5 AP, 2.5 L, 260/2.5 P, 2.5 H, 2.5 HA, 2.5 HB, 49, 29.2 R, 29.2 UA; 264/53, 54

[56] References Cited

U.S. PATENT DOCUMENTS

| | | | |
|---|---|---|---|
| 2,450,436 | 10/1948 | McIntire | 264/53 |
| 2,515,250 | 7/1950 | McIntire | 18/47.5 |
| 2,537,977 | 1/1951 | Dulmage | 18/55 |
| 2,669,751 | 2/1954 | McCurdy et al. | 18/47.5 |
| 2,739,909 | 3/1956 | Rosenthal | 260/2.5 R |
| 2,774,991 | 12/1956 | McCurdy et al. | 18/48 |
| 3,264,536 | 8/1966 | Robinson et al. | 260/49 |
| 3,668,161 | 6/1972 | Nauman et al. | 260/79.3 A |
| 3,959,197 | 5/1976 | Salyer et al. | 260/2.5 H |

*Primary Examiner*—Allan Lieberman
*Attorney, Agent, or Firm*—Bernard Francis Crowe

[57] ABSTRACT

Foamed, low density polymeric articles have been fabricated from a non-tacky hydrogel obtained by blending normally solid thermoplastic polymer resin with a normally liquid organic solvent and water, at lower molding temperatures and energy requirements than those conventionally used in melt extrusion foam processing.

8 Claims, 5 Drawing Figures

HYDROGEL DOUGH COMPOSITION FOR FABRICATION OF FOAMED ARTICLES

BACKGROUND OF THE INVENTION

This invention pertains to the fabrication of low density, foamed articles of normally solid thermoplastic polymer resins and more particularly to the use of non-tacky hydrogels formulated from a mixture of resin, organic solvent, and water for this purpose.

Solvent plasticization of polymers is a known technique of producing low density polymer foams at low processing temperatures. A major problem in fabricating low density, foamed polymer resins from solvent plasticized polymers in gel form is the high adhesion the gel exerts on substrates which it may contact. This adhesion to substrate creates problems in handling and transferring of the plasticized gel into molds which form the foamed shape. This problem also exists with polymer pellets which are highly plasticized.

There is a continuing effort to discover ways of handling these tacky polymer gels because of the cost saving which accompanies the lowering of the density of the polymer foams produced from them. Although the physical properties of polymers are generally reduced when the polymers are plasticized, due to the lowering of the second order transition temperatures (Tg), this deficiency is negatived when fugitive organic solvents are used to produce the polymer gels.

Increasing the solvent content of the polymeric gel increases the mold fill by increasing the gel's plasticity. However, as the plasticity is increased the resultant adhesion to substrates of the gel is also increased.

Another problem associated with highly solvent plasticized polymers which contain low boiling point solvents is the containment of the solvent within the gelled polymer for extended periods of time subsequent to the final foaming of the shaped article.

SUMMARY OF THE INVENTION

A method of fabricating low density, foamed articles has been discovered which comprises the steps of:
(a) blending at least one normally solid thermoplastic resin with about 25 to about 80 parts, per 100 parts by weight of said resin, of a normally liquid organic solvent having a solubility parameter, δ, within (1.30 calories per cc)$^{\frac{1}{2}}$ of that of said resin, or a mixture of normally liquid organic solvents having an average solubility parameter, δ, within about (1.3 calories per cc)$^{\frac{1}{2}}$ of that of said resin;
(b) blending the mixture obtained in step (a) with at least about 1 part by weight, per hundred parts of resin, of water whereby a non-tacky hydrogel dough is obtained;
(c) shaping the hydrogel dough obtained in step (b);
(d) vaporizing the solvent and water;
(e) removing the solvent and water; and
(f) recovering a foamed resin article.

The theory of solubility parameters and a listing of values for various solvents can be found in articles by H. Burrell, Interchemical Review, 14, 3, 31 (1955), J. L. Gardon, J. Paint Technology, 38, 43–57, (1966) and C. M. Hansen, I and EC Product Research and Development 8, No. 1, 2–11, March (1969).

The invention is not limited to any particular thermoplastic polymer resins or even to single resin systems since mixtures of resins can be used. However, it has been found particularly useful to employ this invention with polyarylene polyether polysulfone thermoplastic resins, thermoplastic polyarylene polyhydroxy ethers, polystyrene, impact polystyrene, crystalline polystyrene, acrylonitrile/butadiene/styrene terpolymers, olefin copolymers containing polar comonomers, vinyl chloride polymers, and the like.

DESCRIPTION OF THE INVENTION

The polyarylene polyether polysulfone thermoplastic resins of this invention contain repeating units having the formula

[Ar—SO$_2$]

wherein Ar is a divalent aromatic radical containing at least one unit having the structure in which Y is oxygen, sulfur or the radical residuum of an aromatic diol, such as 4,4'-bis(p-hydroxyphenyl)alkane. Exemplary polysulfones include those which have the following units:

copolymerized units of wherein Q is oxygen or sulfur, as well as any combination of these repeating units.

The degree of polymerization of these polysulfones is sufficiently high so as to afford normally solid thermoplastic resins.

These polysulfone resins can be prepared by a substantially equimolar one-step reaction of a double alkali metal salt of a dihydric phenol with a dihalobenzenoid compound in the presence of specific liquid organic sulfoxide or sulfone solvents under substantially anhydrous conditions using an azeotroping solvent such as chlorobenzene.

A particularly preferred polyarylene polyether polysulfone thermoplastic resin is one composed of repeating units having the structure shown below:

wherein n equals 10 to about 500. This is commercially available from Union Carbide Corporation as UDEL Polysulfone P-1700.

The term "thermoplastic polyhydroxyether" herein refers to substantially linear polymers having the general formula:

wherein D is the radical residuum of a dihydric phenol, E is an hydroxyl containing radical residuum of an epoxide, and a represents the degree of polymerization and is at least 30 and is preferably 80 or more. The term "thermoplastic polyhydroxyether" is intended to include mixtures of at least two thermoplastic polyhydroxyethers.

The thermoplastic polyhydroxyethers can be prepared by admixing from about 0.985 to about 1.015 moles of an epihalohydrin with one more of a dihydric phenol together with from about 0.6 to 1.5 moles of an alkali metal hydroxide, such as, sodium hydroxide or potassium hydroxide generally in an aqueous medium at a temperature of about 10° to about 50° C., until at least about 60 mole percent of the epihalohydrin has been consumed. The thermoplastic polyhydroxyethers thus produced have reduced viscosities of at least 0.43, generally from 0.43 to about 1. and preferably from 0.5 to 0.7. Reduced viscosity values were computed by use of the equation:

$$\text{Reduced Viscosity} = \frac{t_s t_o}{c t_o}$$

wherein $t_o$ is the efflux time of the solvent (tetrahydrofuran), $t_o$ is the efflux time of the polyhydroxyether solution, c is the concentration of the polyhydroxyether solution in terms of grams of polyhydroxyether per 100 ml. of tetrahydrofuran.

A preferred thermoplastic polyhydroxyether is one where D is and E is

—CH₂CHOHCH₂—

Other preferred thermoplastic resins such as polystyrene, impact polystyrene, crystalline polystyrene, acrylonitrile/butadiene/styrene terpolymer, polyvinyl chloride, vinyl chloride copolymers such as those obtained by copolymerization of vinyl chloride with alpha olefins, namely ethylene or propylene, vinyl acetate, vinyl alcohol and the like, and olefin copolymers, such as, ethylene/vinyl acetate copolymers, ethylene/alkyl acrylate copolymers, ethylene/acrylic acid or methacrylic acid copolymers and their ionomers, ethylene/vinyl acetate/vinyl alcohol copolymers, ethylene/maleic acid or acid anhydride copolymers propylene/acrylic or methacrylic acid copolymers, butadiene/acrylic acid or methacrylic acid copolymers, and the like are all well known in the art and commercially available.

The values of the solubility parameters of the normally liquid organic solvents used in this invention are fairly critical as evinced by the fact that with a most preferred thermoplastic resin such as polyarylene polysulfone depicted above having the repeating units wherein n is as defined above, there is a distinct difference between structurally similar solvent isomers. Thus for example the above-described polyarylene polysulfone, which has a solubility parameter calculated to be 10.55, is soluble in 1,1,2-trichloroethane having a solubility parameter of 10.18 but insoluble in 1,1,1-trichloroethane having a solubility parameter of 8.57. However, a mixture of organic solvents which individually is unsatisfactory can be used as long as the average solubility parameter of the mixture is within (1.30 calories per cc)^(1/2) of the resin being blown. In addition, if the Tg of the polymer that is to be plasticized is exceptionally high in value, plasticity of the gel can be prolonged during the foaming step by forming a mixture of solvents, one of which should have a much higher boiling point value. Thus for example while ethanol or 1,1,1-trichloroethane cannot be used individually with the polyarylene polysulfone depicted above a mixture comprising equal parts by volume of ethanol and 1,1,1-trichloroethane can be used. Other combinations which function as organic solvents for polyarylene polysulfone are:

95% chloroform and 5% water,
85% methylene chloride, ethanol 20% and water 5%,
95% tetrahydrofuran and water 5%,
75% methylene chloride, 10% acetone, 10% ethanol, and 5% water, and
80% cyclohexanone, ethanol 15% and water 5%.

The criticality extends to other thermoplastic polymer resins as well. These organic solvents or mixtures thereof, having the proper solubility parameters, lead however to tacky masses when mixed with thermoplastic polymer resins and are not readily manageable for the purposes of preparing foamed articles since they stick to the forms, molds, mixing equipment and other equipment used for preparing the finished articles. The addition of water to such tacky masses quite unexpectedly afforded non-tacky hydrogels which resemble flour dough or putty. The amount of water added is not critical but generally at least 1 part is required per 100 parts by weight of resin. There is no maximum amount because excess water separates from the dough-like mass as a separate phase. Because of the phase separation, where the solvent employed is for the most part not miscible with the water phase, the excess water acts as a protective blanket which prevents rapid solvent loss from the plasticized polymer. This feature allows the plasticized polymeric gel to be exposed in an open vessel during handling and transfer without sealed containment. In this form the polymer blend can be easily transferred from one vessel or container to another and can be shaped and molded or otherwise worked without the necessity for using contaminating release agents. Simple mixing equipment known to those skilled in the art is all that is required to blend the water into the mixture of thermoplastic resin and liquid organic solvent. The resultant hydrogels can be used immediately or if desired stored indefinitely under water and then recovered and used without further treatment.

The organic solvent once it diffuses into the polymer resin, serves two purposes, namely, the formation of a gel retaining a finite solvent concentration in a plasticized form and secondly the solvent serves as a blowing or foaming agent at a much lower temperature and viscosity than that which would be required to foam the original non-plasticized polymer resin with a conventional gaseous type blowing or foaming agent. At blowing temperatures of from 165°–200° C. necessary for polyarylene polyether polysulfones, most of the commonly used organic solvents diffuse out of the polymer blend too quickly to provide adequate blowing of the resin. During the blowing operation the water in the hydrogel is also removed with the normally liquid organic solvent. Thus while the second order transition temperature (Tg) of the polymer resin being treated in this manner is lowered, enhancing the processing of the polymer at lower temperature, the liquid organic solvent and the water being fugitive in nature, when removed from the polymer resin leave the foamed article with the physical properties of the original resin prior to processing. This is extremely important in the case of polymers which are difficult to process because of their viscoelastic and rheological properties or heat instability.

The hydrogel dough obtained by the method of this invention provides lower viscosities than would be attained by a mixture of resin and organic solvent alone which reduces process pressure requirements. It has the advantage also of extending the handling characteristics of the mixture of resin and solvent at higher solvent concentrations without sticking. Furthermore this technique permits better flow for preforming prior to mold transfer for the final flowing or foaming operation. This method also prevents rapid solvent loss and non-homogeneity during storage of the solvent resin mixture. In addition, the lower viscosities realized from this technique facilitate higher particulate and fibrous loading by direct mechanical mixing into the hydrogel dough. It also has the advantage of permitting the use of lower pressure molds which can be made of plaster or silicone rubber. Lastly this technique allows continuous smooth skins to be formed with a core matrix without surface pellet boundaries in the final foamed article.

The method of this invention can be extended to many practical applications. For example in the automotive field composite structures, which may be sandwich construction (two skins) or single skin reinforcement, can be fabricated for recreational vehicles and door and body stiffening. Skins may be glass, metal stampings or plastics. These structures can be injection molded, vacuum-formed, cast or fabricated by other methods known and practiced in the art. Energy absorption front and rear ends can also be fabricated as well as foam filled hollow structural members for added flexural and compressive strengths.

In the medical field, foam plastic ovens, incubators, thermal wear and sterilizers can be fabricated. Medical disposable items, prosthetic devices cast from corrective orthopedic plastic cases, as for example, neck, back braces, skeletal implants and body casts can also be manufactured. Foamed composite casts can be made which employ filler reinforcement such as fiber glass, glass cloth, non-woven glass mats or Thornel fibers to increase the flexural strength to weight ratio of the resultant article.

Consumer products, such as, foamed exterior thermal jacket type jugs bonded to an inner liner of glass, plastic or metal coffee makers, appliances, food warmers and the like can be manufactured from all foamed articles or composites according to this invention.

In the sports field, glass-filled, foamed oars, tennis rackets, hulls, snowmobile engine covers, deck and bulkhead insulation and floatation aids may be manufactured.

In the furniture field a foamed matrix over metal wire or rod can produce furniture forms for subsequent finishing operations employing flexible foam and cloth coverings.

For military use, energy absorption dunnage for air drops, shelters, and the like, can be fabricated as well as foamed cores with and without skins for parts, such as, aircraft frames. Honeycomb cores of metal or plastic can be filled with the foam to increase physical property performance.

For general commercial application one can form plastic "dry" bearings with molybedenum disulfide, graphite, bronze, Teflon and tin powder molded to close tolerances. The load bearing capabilities of metallic and non-metallic honeycombs can be enhanced by filling them with low density foam. The foamed resin may also be used in separating the single wires present in telephone cable construction.

In addition, the ability to foam and bond adhesive primed and non-primed metal inserts, in one step allows novel means of producing electrical motor housings and flat rotors.

The construction trade can benefit from sound absorbent panels, as for example, lead powder plus polyarylene polyether polysulfone foam, compressor and refrigeration shields, and acoustical tile. Other uses include decorative wood replacement for door and entrance pilasters, house shutters, hot water tank floats and vending machine hot beverage and food dispensers.

In the agricultural field biodegradable plastic planters, can be provided from wood flour and cellulose fillers in foam plastic. Slow release from pellets containing herbicides and insecticides, can also be of use, as well as, foamed irrigation pipe.

For art instruction, sculpture and scale models, mobiles, school exhibits, and the like, can be prepared with simple plaster rubber or silicon rubber molds and a hot air oven.

The wide latitude of conditions under which the foaming operation can be carried out in this process was also quite surprising. Thus for example while one can practice the foaming step at higher temperatures using steam, hot water, an oven or other heat transfer device, one can also operate at the other end of the spectrum, that is, at room temperature or by placing the hydrogel in a vacuum device, such as, a vacuum oven and with organic solvents of low volatility, such as, methylene chloride, readily remove the solvent and water in a relatively short time. Obviously this affords both savings in terms of power requirements and also permits the foaming of extremely low heat stable polymers or polymers in which extremely low heat stable additives or fillers have been combined. The low temperature technique also preserves mechanically fragile fillers from breakdown which would normally be encountered in conventional hot processing, high shear rate extrusion.

An intermediate modification may also be employed by preforming the hydrogel cold in a recycle mold from which the extraneous hydrogel is removed and recycled to the hydrogel source and then the cold preformed article placed in a similar mold in a hot air oven where the foaming operation takes place. Alternatively the cold hydrogel can be shaped into a preform, again removing the excess hydrogel and returning it to the hydrogel source for preforming, then foaming the preform, either in the same mold or in a secondary mold again saving on unused resin. This is particularly adaptable to the fabricating of foamed polyarylene polysulfone food trays.

Another useful technique employed with the hydrogels of this invention is the preparation of slabs of foamed polymer by slot casting the hydrogel directly into an oven between rollers and belts which gradually expand with the expanded polymer volume during the foaming operation.

The fabrication of foamed articles can be effected in diverse types of molds, as for example, telescoping molds as well as captive or non-expanding, non-telescoping molds. The former are more sophisticated than the latter and have the advantage that they may be adjusted during the foaming or blowing operation to permit the foamed article to adapt to the exact internal contours of the mold obviating structural imperfections therein, such as, blow holes, rough or irregular surfaces, and the like. Where, however, the expertise of the fabricator is highly developed, one may also employ captive molds to produce foamed articles free of structural imperfections and blemishes by choosing preform doughs in a narrow weight range such that the foamed articles closely follow the internal contours of the mold. This is demonstrated infra by several Examples describing the formation of molded bars.

Still another practical application of this invention is the use of pellets of thermoplastic polymer prepared by imbibing the organic solvent and water into the thermoplastic polymer in an imbibition tank which passes the resultant hydrogel to an homogenizer and then to a heated pelletizer where pellets of the particular polymer containing both solvent and water are obtained. By this procedure, the pellets thus formed do not adhere to one another although the pellets may contain over three times the solvent concentration which would cause pellet to pellet adhesion. These pellets can then be passed into a mold where they are foamed to the dimensions of the mold. This process is vastly superior to the prior art method of prepelleting the polymer and then attempting to imbibe solvent into the preformed pellets. The instant technique provides a much higher concentration of blowing agent in the form of the solvent and water within the pellet than can be obtained normally by the imbibing solvent into preformed pellets because the latter is complicated by the fact that diffusion time through the walls of the preformed pellet is lengthy and the concentration of solvent on the outer surface of the pellet is generally so high that tackiness and pellet to pellet adhesion develops. As those skilled in the art are aware the charging of tacky pellets to a mold is not an efficient operation.

In still another procedure the hydrogel dough can be pressed into a section of shaped screening and foamed. The foamed article then has a grid-like surface appearance.

Various fillers can be added to the polymeric hydrogels in varying amounts, i.e., from about 1% to about 60% by weight, if desired. Such additives include glass fiber; cellulosic materials, such as, sawdust, paper, cane, rattan, bamboo and the like; Thornel (trademark for Union Carbide carbon fiber); graphite; molybdenum disulfide; Teflon fibers (trademark for polytetrafluoroethylene); metal particles and fibers, particularly powdered bronze, steel wool, powdered iron or tin, and the like; barium ferrite; $Al_2O_3.3H_2O$; vermiculite; natural or synthetic rubber; and the like.

The presence of $Al_2O_3.3H_2O$ alone or with vermiculite imparts flame resistance to articles foamed by the method of this invention.

As a variation of this invention the foamed article can be fabricated in the form of a laminate consisting of alternating layers of foamed polymer resin and fibrous filler in mat form.

Where a mold is used to control the shape of the foamed article, the material of construction of the mold can vary widely ranging from steel or Teflon coated steel to silicone rubber, plaster or even porous paper pulp.

Still another variation of this invention consists in inserting structural members into the mold with the colloidal gel to form a foamed composite wherein these members are adhesively bonded to the foamed composite. These structural members can be metallic or non-metallic. In the case of metallic structural members they are particularly useful in serving as an electrical conductor, electromagnetic coil, permanent magnet, metallic mesh or grid, and the like. Preferred foamed composites in the electrical field provided by this invention are encapsulated components, such as, audio transformers, capacitors, resisters and the like.

Preferred non-metallic structural members are fabricated from cellulosic materials and woven glass cloth.

It has also been found that where the foamed articles are pellets, their density and sphericity can be controlled closely by first letting pellets of hydrogel dough, prior to foaming, stand at ambient temperatures exposed to the atmosphere whereby some of the organic solvent and water vaporizes from the surface of said pellets and subsequently carrying out the foaming step by exposing the pellets to elevated temperatures. Hot to boiling water (i.e., 40°–100° C.) is a cheap, convenient method of providing the elevated temperature. Generally it is preferred to allow the pellets to stand at room temperature exposed to the atmosphere for at least 45 minutes.

Another modification in this improved method for fabricating low density, foamed articles is to incorporate a minor amount, i.e., less than about 10% by weight of a water soluble additive into the hydrogel dough together with the normally solid thermoplastic polymer resin, organic solvent and water. This modification serves to impart a more porous structure to the foamed article.

One of the ancillary advantages of the hydrogel doughs of this invention lies in the fact that they permit the processing of fillers in the foaming operation at below the extrusion temperatures conventionally used for polymers exhibiting high glass transition temperatures, such as, the polyarylene polyether polysulfones. This has a particularly useful application in the fabrication of foamed articles having increased flame resistance. Thus aluminum hydrate $Al_2O_3.3H_2O$ which is stable up to about 280° F. (138° C.) can be used as filler with polysulfones or other thermoplastic polymers having a high Tg without losing its three waters of hydration during the process of foaming the desired article. Specific data are presented in the working Examples.

The invention is further described in the Examples which follow. All parts and percentages are by weight unless otherwise specified.

EXAMPLES 1-7

To 400 gms. of UDEL polysulfone P-1700 resin in a one gallon wide mouth jar was added 319.2 gms. of methylene chloride with agitation. The jar was sealed and allowed to stand at room temperature for 16 hours. A polysulfone/methylene chloride brown gel was obtained to which 558 gms. of water were added with mixing. The brown gel turned white in color. These proportions formed a standard dough mix (SDM). In all subsequent Examples reference to standard dough mix refers to the weight ratios of solvents to polymer.

A 30 g. portion of the SDM was shaped at room temperature by hand compression into a ⅛" aluminum metal plate 8" × 8" having a circular hole measuring 4⅞" in diameter. The resultant dough preform was then inserted at 155° C. into a heated telescoping type aluminum mold consisting of an upper 5" aluminum disc, fastened to the upper platen of a press, which slides into a ring and meets another 5" aluminum disc within the ring.

The ring and bottom disc were not fastened to the bottom platen of the press.

Upon insertion of the dough preform the press was closed allowing both disc mold surfaces to compress the preformed dough with a pressure of 50 psi. During the following 15-25 seconds a pressure build up occurs due to the volatilization of the solvents. The pressure builds up to 152 psi at which point the press was released slowly to maintain a pressure of 125 to 150 psi. The release of the pressure allows movement of the mold surfaces activating an expansion of the mold with subsequent release of solvent and water vapor from the mold and polymer expansion. During the dwell time in the mold continuous solvent and water vapor loss further reduces the pressure to about 50 psi or less. After a total of four minutes the mold was opened and the foamed disc was removed. The disc had smooth surfaces on both sides and had a density of 0.19 g. cc.

In the following Table 1 substantially the same parameters were employed to produce various foamed discs by this method.

TABLE I using a 5" aluminum telescoping mold
POLYSULFONE P-1700

| EXAMPLE | PREFORM SDM WT. GMS. | TYPE OF FILLER IN PREFORM & WT. IN GRAMS | MOLD INSERTION TEMP. °C | MOLD CLOSE PRESSURE PSI | REDUCED BLEED PRESSURE PSI FROM-TO | TOTAL MOLD TIME MIN. | DENSITY OF FOAMED DISC G/CC. | WT % OF FILLER | COMMENTS |
|---|---|---|---|---|---|---|---|---|---|
| 1 | 30 | NONE | 155 | 50 | 125-50 | 4 | 0.19 | — | smooth surfaces |
| 2 | 45 | PPG Glass Mat-Non Woven AMM-1[a] (2 oz) 11.2 gms. | 165 | 50 | 125-40 | 3.5 | 0.47 | 28.5 | glass strands are not visible on surface. (smooth) |
| 3 | 40 | AMM-1 (2 oz) 17 gms | 165 | 60 | 125-50 | 3.0 | 0.51 | 39.2 | smooth surfaces |
| 4 | 35 | AMM-2[b] (2 oz) 18 gms | 165 | 50 | 120-40 | 3.5 | 0.65 | 45.3 | some strands are visible on surface but fairly smooth |
| 5 | 20 | NONE | 155 | 50 | 125-40 | 3.0 | 0.31 | — | very smooth skins |
| 6 | 45 | Cellulose fibers in water dry wt 25 g | 155 | 50 | 203 psi-30 sec 100 psi-30 sec cool at 75 psi | 3.0 | 0.51 | 50 | slightly rough surfaces |
| 7 | 57.5 | steel wool fibers 13.3 gms | 155 | 50 | 125-30 | 4.0 | 0.47 | 35 | fibers visible at surface; disc is attracted by magnetic field |

[a] AMM-1 is a fiber glass chopped strand reinforcing mat sold by Pittsburgh Plate Glass Company coated with high bond resin.
[b] AMM-2 is a fiber glass chopped strand reinforcing mat sold by Pittsburgh Plate Glass Company coated with medium bond resin.

EXAMPLES 8-14

A white pigmented sheet of UDEL polysulfone P-1700 5" in diameter and 9 mils in thickness was inserted into the bottom of the 5" telescoping mold described in Example 1. A preform 4⅞" in diameter of SDM prepared from polysulfone was placed on top of the plastic sheet and the press closed to a pressure of 50 psi. The press temperature was 155° C. The pressure within the mold increased to 200 psi in 20 seconds, at which point it was slowly released to hold this pressure for 30 seconds, then released to 75 lbs. Within a total time of three minutes the pressure dropped because of the venting of the organic solvents and water as the mold faces separated to a pressure of 30 psi. After 4 minutes the press was opened and a foamed disc bonded to the polysulfone sheet was removed.

Subsequent Examples with other facing material inserts were performed as in Table II.

TABLE II

POLYSULFONE COMPOSITES FORMED IN 5" DISC MOLD

| EXAMPLE | PREFORM SDM WT. GMS | INSULATION MATERIAL AND THICKNESS (MILS) | MOLD TEMP °C | MOLD CLOSE PRESSURE PSI | REDUCED BLEED PRESSURE PSI | TOTAL MOLD TIME | DENSITY OF COMPOSITE G/CC. | COMMENTS |
|---|---|---|---|---|---|---|---|---|
| 8 | 40 | 9 mil white polysulfone sheet | 155 | 50 | 200–75 | 4 | 0.25 | slightly rippled surface of inserted sheet compared insertion surface |
| 9 | 30 | 9 mil white PSF sheet over 20 mil kraft paper insert | 155 | 50 | 200–75 | 4 | 0.30 | kraft paper did not adhere to PSF sheet. Sheet surface greatly improved. |
| 11 | 40 | 10 mil C.R. steel disc primed on one side with polysulfone primer* | 155 | 50 | 200–50 | 4 | — | Adhesion of steel to foam is 18 lbs./in. in peel at Instron crosshead speed of 2"/min |
| 12 | 30 | Corduroy cloth disc | 155 | 50 | 200–40 | 4 | 0.20 | excellent**adhesion of cloth to foam |
| 13 | 30 | Muslin printed fabric | 155 | 50 | 200–50 | 4 | 0.26 | excellent**adhesion of fabric to foam |
| 14 | 30 | 20 mil kraft paper each side of preform | 155 | 50 | 200–50 | 3.5 | 0.22 | excellent**adhesion of paper to foam |

*The steel insert was dipped in a 10% solution by weight of polysulfone in methylene chloride, dried at room temperature for 20 minutes baked at 100° C. for 10 minutes, then baked at 360° C. for 10 minutes.
**Excellent denotes foam cohesive failure in testing from composite substrate.

EXAMPLE 15

A section of aluminum honeycomb 6" × 6" manufactured by Hexcel having a height of 0.500" and 3/16" cells fabricated from 5052 alloy with a gauge of 0.0020" was primed by solvent/polysulfone P-1700 resin solution dipping as in Example 11 and filled with SDM polysulfone by placing a ⅛" thickness of the plasticized hydrogel dough over the honeycomb and rolling it with a 1" diameter wooden roller.

The filler honeycomb was then placed between the platens of a Carver press at a temperature of 120° C. and clamped with a pressure of 40 psi. The honeycomb, removed after 8 minutes was completely filled with polysulfone foam. Adhesion between the foam and the aluminum was determined to be 2.5 lbs/inch in peel strength (Instron Tensile Tester at 2"/min. crosshead speed).

Compressive load tests performed on filled and unfilled samples prepared as outline above showed the following properties.

Hexcel Core without foam fill 313.33 psi at 3% strain.
Hexcel Core filled with foam 1,120.0 psi at 2% strain.
The density of the foam was 0.19 g./cc.

EXAMPLES 16–31

Insertion of several primed and unprimed metal substrates with plasticized polysulfone P-1700 resin into the 5" telescoping mold described in Example 1 at 180°–190° C. and a dwell pressure of 200 psi for a minimum of 40 seconds before pressure bleed off and removal from the mold resulted in the production of composites having the values shown in Table III.

TABLE III

METAL ADHESION PLASTICIZED PSF FOAMS (180–190° C)*

| EXAMPLE | SUBSTRATE | PRIME COATING | COATING BAKE T° C[b] | PEEL STRENGTH LBS./IN.[c] | TYPE OF FAILURE |
|---|---|---|---|---|---|
| 16 | Copper | None | — | 0 | Adhesive |
| 17 | Copper | Silane end capped SO[a] | 180 | 1 | Adhesive |
| 18 | Copper | Silane end capped SO | 240 | 1 | Adhesive |
| 19 | Copper/CuO ctg. | None | — | 10.5 | Cohesive (CuO) |
| 20 | Copper/CuO ctg. | 10% PSF/CH$_2$Cl$_2$ | 180 | 6.4 | Cohesive (CuO) |
| 21 | Copper/CuO ctg. | 10% PSF/CH$_2$Cl$_2$ | 240 | 11.5 | Cohesive (CuO) |
| 22 | Copper/CuO ctg. | Silane end capped SO | 180 | 6.4 | Cohesive (CuO) |
| 23 | Aluminum | None | — | 0 | Adhesive |
| 24 | Aluminum | 10% PSF/CH$_2$Cl$_2$ | 180 | 0.6 | Adhesive |
| 25 | Aluminum | 10% PSF/CH$_2$Cl$_2$ | 240 | 2.5 | Adhesive |
| 26 | Aluminum | Silane end capped SO | 180 | 11 | Ad.Coh. 50–50 |
| 27 | Aluminum | Silane end capped SO | 240 | 23 | Cohesive |
| 28 | Cold Rolled Steel | None | — | 0 | Adhesive |
| 29 | Cold Rolled Steel | 10% PSF/CH$_2$Cl$_2$ | 320 | 19.1 | Cohesive |
| 30 | Cold Rolled Steel | Silane end capped SO | 180 | 3.1 | Adhesive |
| 31 | Cold Rolled Steel | Silane end capped SO | 240 | 19.5 | Cohesive |

*Foamed PSF produced at 180–190° C. - 40 sec.
[a]Coating: 10/90 by wt. end capped bisphenol-A terminated sulfone oligomer with 3-chloropropyl-trimethoxy silane.
[b]10 min. bake time
[c]Instron at 2"/min. cross head speed

EXAMPLES 32–36

Figure 1:
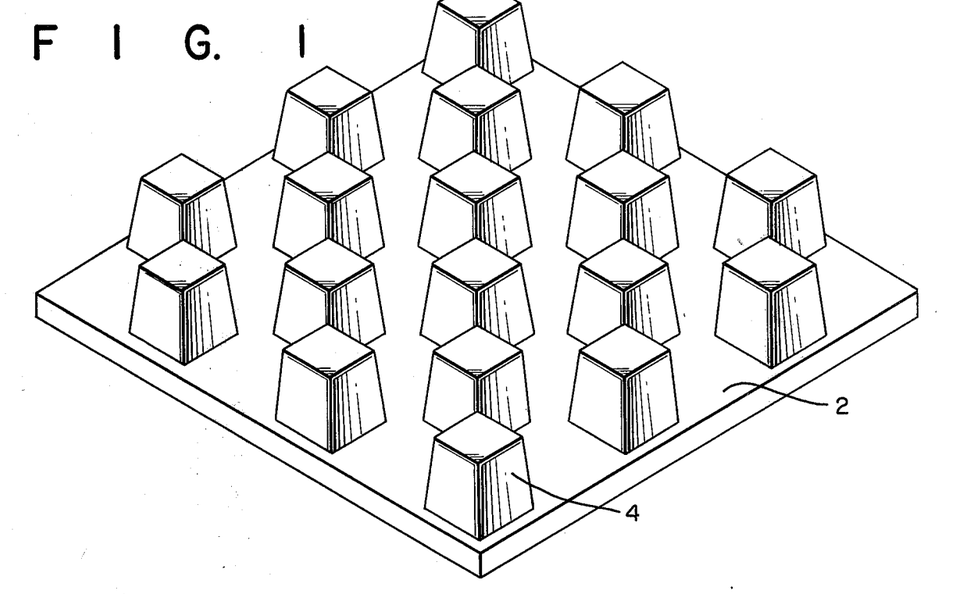
FIG. 1 is an isometric view of a foamed core mold plate.
Figure 2:
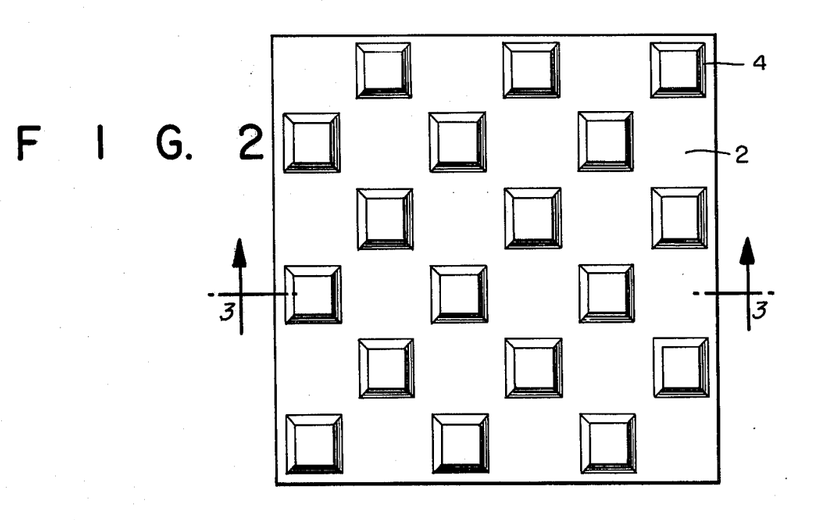
FIG. 2 is a plan view of a foamed core mold plate.
Figure 3:
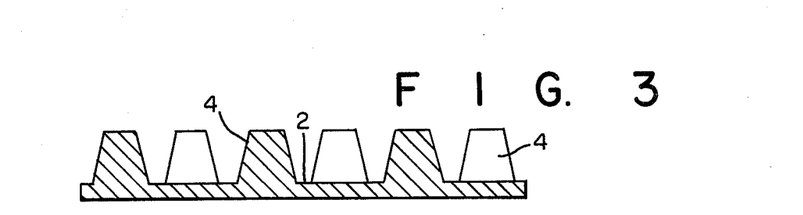
FIG. 3 is a side view in section of a foamed core mold plate taken along line 33 of FIG. 2.

A telescoping mold particularly adapted for use with the hydrogel dough compositions of this invention was constructed from two aluminum foamed core mold plates designed as shown in FIG. 1. The base mold plate has a planar bottom face and a planar top face having a plurality of regularly spaced truncated rectangular pyramids, 4, integrally joined to the latter. The upper mold plate has a planar top face and a planar bottom face also having a plurality of regularly spaced truncated rectangular pyramids, 4, integrally jointed to the latter. The base mold plate and upper mold plate are positioned within a rectangular sleeve, shown in FIG. 4, which snugly holds them together but has sufficient clearance with their outer dimensions to permit them to slide in and out, in such a manner that the face, 2, of each plate faces the face, 2, of the other and can be brought together with the truncated rectangular pyramids of the respective plates located in an intermeshing arrangement. Thus the truncated rectangular pyramids of the upper plate fit into the spaces between the truncated rectangular pyramids, of the base plate and vice versa. This is readily accomplished by aligning the two plates on a flat surface side by side with the truncated rectangular pyramids of each projecting up and oriented as in FIG. 2. When either plate is lifted, turned 180° and then placed on the other plate, the truncated rectangular pyramids will intermesh.

Figure 4:
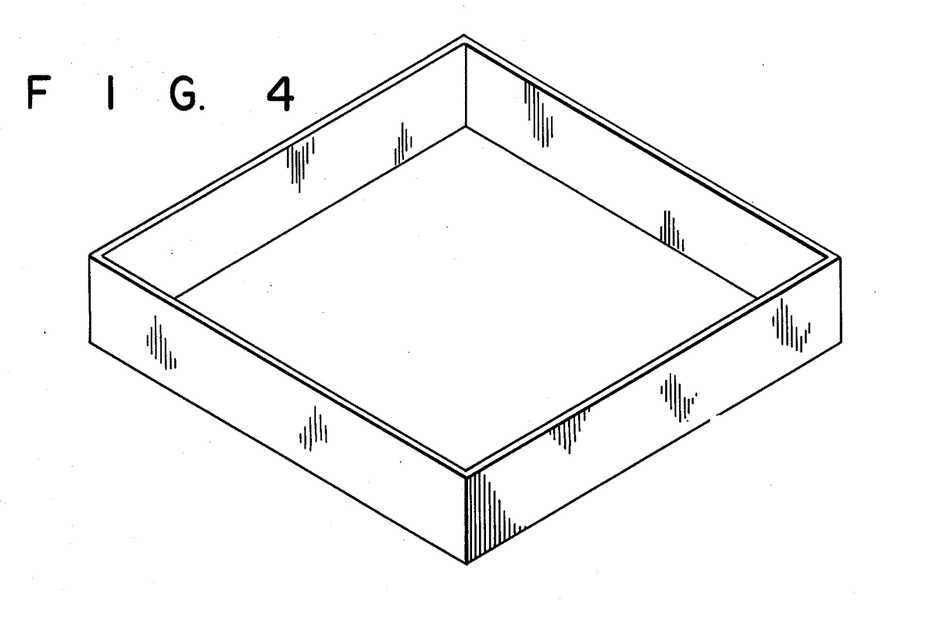
FIG. 4 is an isometric view of a sleeve for containing two of the mold plates delineated in FIG. 1 superimposed on one another face to face.
Figure 5:
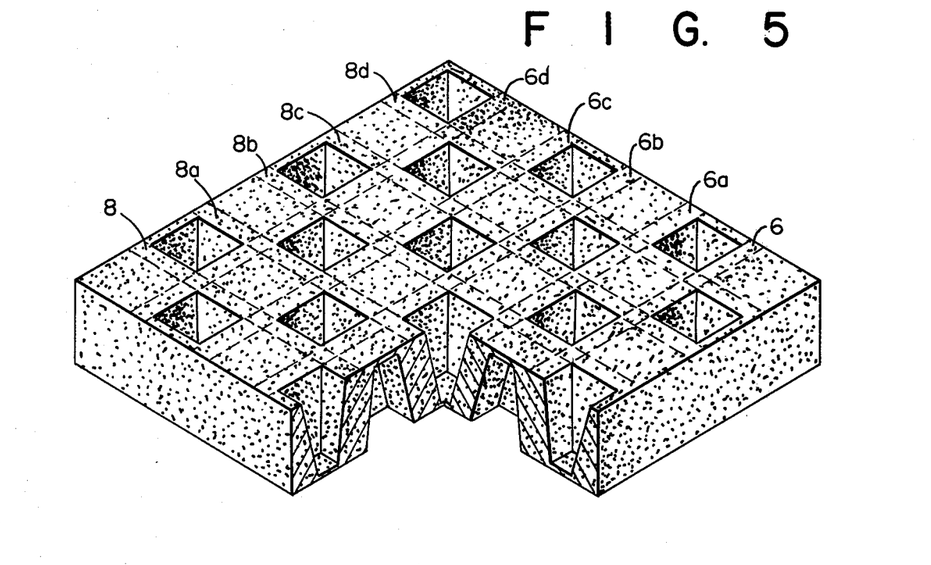
FIG. 5 is an isometric view of a foamed core fabricated from two foamed core mold plates, delineated in FIG. 1 with a section broken away.

The two mold plates thus positioned in the jacket, shown in FIG. 4 with a layer of P-1700 polysulfone preformed hydrogel dough mix weighing about 130–140 grams in the form of a square 5 7/16" sandwiched in between was placed in a Carver press. The mold was heated to 200° C. for 1 minute at 75 psi, cooled with water in the cooling channels of the press platens for 1 minute and then allowed to stand for 4.5 minutes. The sleeve of FIG. 4 was removed from the mold plates. The upper mold plate was then removed exposing a foamed polysulfone core structure delineated in FIG. 5 measuring 5½" × 5½" × ¾" and having a density of 0.226 g./cc. Such core structures have finite beam elements which are limned in FIG. 5 as 6, 6a, 6b, 6c and 6d and at perpendicular intervals 8, 8a, 8b, 8c and 8d. These elements impart greater flexural strength to these core structures than could be obtained in core structures having rounded voids of the same core density.

The telescoping mold described above is not limited to the fabrication of foamed resin articles but can be used with any resin which can flow and assume the configuration of the intermeshed, compressed mold plates.

Other specimens were prepared in a similar manner with other resins unless otherwise noted in Table IV.

EXAMPLE 37

A portion of the standard dough mix (SDM) made with methylene chloride, water and polysulfone, was rolled out with a wooden roller to a ⅛" thickness.

The rolled dough sheet was then placed upon paper toweling and exposed to air from 10 minutes. A ⅛" diameter metal punch was used to shear ⅛" × ⅛" pellets, which were allowed to air dry at room temperature (22° C.) for 5 minutes. In this form, there was no evidence of pellet blocking.

The pellets were then dropped into water at 90°–94° C. In three seconds the pellets expanded to a diameter of 5/16" average diameter. Some of these pellets fused to each other. The pellets were not regular in sphericity and had large cell structure.

The same pellets when exposed to room temperature drying for 45 minutes prior to hot water (90°–94° C.) blowing showed finer cell structure, better sphericity, less fusion in the water bath and slightly less density measuring ¼" in average diameter.

EXAMPLE 38

The pellets described in Example 37 were placed in a wire cylinder made of fine brass wire screening having 80 strands of wire to the lineal inch which was formed into a closed cylinder measuring ½" in diameter by 3" long. The amount of pellets used was sufficient to volumetrically fill ⅝ of the enclosed volume of the cylinder. The cylinder was then immersed into boiling water for 1 minute and removed. A cylinder of foamed polysulfone, replecating the interior volume of the open mesh screen container was removed. Each pellet had expanded and fused to an adjoining pellet producing a shaped object.

EXAMPLE 39

The pellets described in Example 37 were placed into a 19 × 90 mm cellulosic extraction thimble (a Whitman seamless tube open on one end, manufactured by W. &. R. Balston Ltd. England).

Again, the thimble was filled volumetrically to ⅝ of its' total length and placed into a circulating hot air

TABLE IV

| | | P-1700 POLYSULFONE FORMED CORE MOLD | | | | | | |
|---|---|---|---|---|---|---|---|---|
| EX- AMPLE | PRE- FORM SDM WT. G. | INSERTION OF FILLER MATERIAL INTO PREFORM TYPE & WT. G. | MOLD TEMP. °C | MOLDING CLOSE PRESSURE PSI | TOTAL MOLDING TIME MIN | DENSITY OF MOLDING G./CC. | FILLER % | COMMENTS |
| 32 | 140 | none | 200 | 75 | 6½ | 0.226 | — | fairly smooth surfaces of core molding |
| 33 | 130 | none | 145 | 75 | 3 | 0.20 | — | smooth surfaces of core molding |
| 34 | 130 | 16 g. of continuous filiment glass mat preformed in alternate layers, plastic/glass/plastic | 185 | 75 | 4 | 0.31 | 17.1 | very smooth surface, glass mat conformed to cross-section of molding & are not visible on surface. |
| 35 | 70 | 45 g. vericulite-30 mesh blended into SDM; 20 gms CH$_2$Cl$_2$ added to SDM | 180 | 200 | 5 | 0.34 | 39.1 | very fine cell structure |
| 36 | 130 g. 20% glass/polysulfone[1] | — | 170 | 200 | 5 | 0.22 | — | — |

[1] short fiberglass fill oven heated to 130° C. After 10 minutes the thimble was removed and a fused foamed polysulfone shape which conformed to the paper mold was removed. There was no adhesion of the shape to the paper thimble.

EXAMPLE 40

The pellets described in Example 37 were placed into a 50 ml pyrex beaker which had a cellulosic thimble described in Example 39 bonded to the bottom of the beaker so as to foam an annulus type mold. The mold fill was ⅛". Insertion into a hot air oven at 130° C. for 10 minutes resulted in a fused polysulfone foam molding which did not adhere to either substrate. The porosity of the thimble allowed rapid solvent venting without entrapment in a section thickness measuring ⅜".

EXAMPLE 41

Pellets were formed as described in Example 37, except that 10% by weight of fine sand particles 1/50" to 1/125" in diameter were physically blended into the SDM before punching the pellets. Subsequent immersion into hot water produced a uniform spherical foamed bead measuring 3/16" to 7/32" in diameter.

EXAMPLE 42

Pellets were formed as described in Example 37, except that 4.5% by weight sodium bicarbonate was added to the SDM polysulfone by blending.

Subsequent foaming in hot water showed expansion of the foamed bead to be 3/16" in diameter, uniform in sphericity, good cell structure, with some porosity and no pellet to pellet adhesion during foaming.

The added property of porosity induced by the sodium bicarbonate makes the foamed shape or pellets suitable for applications such as catalyst carriers in chemical reactions, distillation tower packing, slow release of biocides, herbicides and insecticides.

The same mixture in this Example when shaped into a preform ⅜" in diameter by ⅛" thick with 12 holes ⅛" in diameter randomly punched in the preform and blown in hot water at 90°–94° C. expanded into a smooth skinned foamed enlargement of the original preform.

If the bicarbonate was not added, a destorted highly foamed replicate of the preform having a very rough surface exhibiting large cell boundaries was produced.

EXAMPLE 43

A mixture of polysulfone SDM and 4.5% by weight sodium bicarbonate blended into the dough form was rolled out physically into a ⅛" × 8" × 8" sheet form. A 1" arch punch was employed to shear 1" diameter shapes having a thickness of ⅛".

These 1" punch-outs were allowed to be exposed to circulating air at room temperature for 1 hour and then placed in a hot air oven at 125° C. After 10 minutes the punch-out was removed. The ⅛" original thickness has expanded to form a 1" diameter sphere. Cutting this sphere disclosed a thin shell of foamed polysulfone approximately 1/16" to 5/32" in thickness. Shaped hollow articles of various geometrics can be made by this method. Insertion in a porous mold will result in a shaped hollow foamed wall molding replicating the mold form.

EXAMPLE 44

One hundred parts by weight of Astrel 360 (a polysulfone sold by 3M Corporation containing a major amount of repeating units and a minor amount of and repeating units), was plasticized with 80 parts by weight of a mixed solvent consisting of 50% (volume) methylene chloride, 20% (volume) ethanol and 30% (volume) of 1,1,2-trichloroethane. After a solvent gel was formed an excess of water was added and the gel blended to form a non-tacky hydrogel dough. A heterogeneous phase of water formed above the hydrogel. A disc was made in a 5" aluminum disc mold using the processing parameters delineated in Table V. This Table also shows the thickness and density of the disc so made.

EXAMPLES 45–50

Using the technique described in Example 44 discs were also fabricated from ICI Polysulfone 200 P (which contains repeating units), TGD-2100 impact polystyrene (sold by Union Carbide Corporation as a super high impact grade of polystyrene) at two insertion temperatures, Cycolac® TD 1001 (an ABS rubber sold by Borg Warner Chemicals), a 70/30 weight % blend of polysulfone P-1700 and TGDB-2100 and thermoplastic polyhydroxyether (PRNA-8000 sold by Union Carbide Corporation). The process parameters, and disc densities corresponding to these products are also represented in Table V.

TABLE V

| | | | | 5" ALUMINUM DISC MOLD | | | |
|---|---|---|---|---|---|---|---|
| EXAMPLE | POLYMER | PREFORM WEIGHT | INSERTION TEMPERATURE °C | MOLD CLOSE PRESSURE PSI | REDUCED BLEED PRESSURE PSI FROM-TO | TOTAL TIME IN MOLD | DENSITY OF DISC |
| 44 | Astrel 360 | 40g. | 240° C. and | 50 | 203-25 | 10 minutes | .165 g./cc/ |

TABLE V-continued

| EXAMPLE | POLYMER | PREFORM WEIGHT | INSERTION TEMPERATURE °C | 5" ALUMINUM DISC MOLD MOLD CLOSE PRESSURE PSI | REDUCED BLEED PRESSURE PSI FROM-TO | TOTAL TIME IN MOLD | DENSITY OF DISC |
|---|---|---|---|---|---|---|---|
| | (3M) | | held for 10 min. | | | | |
| 45 | Polyethersulfone (ICI) Grade 200P Batch 7172/4 | 30g. | 165° C. | 50 | 203-25 | 12 minutes | .218 g./cc. |
| 46 | Impact Styrene TGD-2100 | 40g. | 145° C. | 50 | 151-25 | Cooled at 90 sec. Removed at 500 sec. | .328 g./cc. |
| 47 | Cycolac TD1001 | 40g. | 145° C. | 50 | 151-25 | Cooled at 190 sec. Removed at 500 sec. | |
| 48 | 70% P-1700 30% TGDB-2100 | 40g. | 150° C. | 50 | 151-25 | Cooled at 180 sec. Removed at 500 sec. | .212 g./cc. |
| 49 | Phenoxy PRNA-8000 Nat. Batch C-91-24B | 40g. | 110° C. | 50 | 125-25 | Maintained 110° C. for 10 minutes. Cooled for 10 min. | .216 g./cc. |
| 50 | TGD-2100 | 35g. | 100° C. | 50 | 151-25 | Cooled at 200 sec. Removed at 500 sec. | |

EXAMPLE 51

Aluminum hydrate also known as gibbsite (C-331 Alcoa grade, 99% having a mesh analysis of 325; Al$_2$O$_3$.3H$_2$O) was physically blended into the standard hydrogel dough mix of P-1700 polysulfone until it constituted 20% by weight of the mix. A foamed sheet ⅛" thick was prepared from a preform measuring 1/16" × 5" × 5" in a Carver press using a captive mold at 280° F. (138° C.) for 2 minutes. This specimen was then tested according to ASTM D-2863-74 for flammability using the oxygen index method. It was also evaluated for smoke density (ASTM D-2840-74) and burning rate (U.L. Bulletin 94 Burning Rate Code). The data obtained and presented in Table VI indicate a marked improvement in burning rate, smoke density and flammability rating over previously available formulations. It will be appreciated by those skilled in the art that these foamed sheets can not be fabricated by conventional extrusion molding technology because the water of hydration would be lost from the aluminum hydrate at the temperatures normally required to extrude polysulfone resins.

EXAMPLE 52

Example 51 was repeated with the exception that vermiculite was also blended into the mixture so that the final composition was 70% P-1700 polysulfone, 20% Al$_2$O$_3$.3H$_2$O and 10% vermiculite. The data obtained with the foamed article from this composition is also presented in Table VI.

Control A is an injection molded specimen of P-1700 polysulfone and Control B is a specimen of P-1700 polysulfone foamed from the standard dough mix, neither Control containing any aluminum hydrate.

TABLE VI

| Example | Oxygen Index[a] % | Smoke Density[b] | Burning Rate[c] | Particle Density, g./cc. |
|---|---|---|---|---|
| 51 | 35.5 | 89.8 | V-0 | 0.505 |
| 52 | 38.5 | 73.0 | V-0 | 0.508 |
| Control A | 30.4 | 92.2 | V-2 | 1.24 |
| Control B | 26.3 | 84.0 | V-2 | 0.299 |

[a]ASTM D-2863-74
[b]ASTM D-2840-70
[c]U.L. Bulletin 94 Burning Rate Code in which V-0 represents Vertical Extinguishing Group 0 and means extinguishment in a vertical bar test in 5 seconds or less average, no single burn value plus afterglow > 10 seconds and no flame dripping; V-2 represents Group 2 and means extinguishment in a vertical bar test in 25 seconds or less; no single burn value plus afterglow > 36 seconds and flame dripping does occur.

EXAMPLE 53

The applicability of the foaming technique of this invention was also demonstrated with mixtures of normally solid thermoplastic polymer resins by using a mixture of 20 g. Bakelite ® VMCC vinyl chloride-vinyl acetate copolymer resin (containing 83% vinyl chloride and 16% vinyl acetate by weight copolymerized therein) and 80 g. P-1700 polysulfone. This blend was mixed first with 79.8 g. of methylene chloride and then an excess of water to produce a non-tacky hydrogel. The hydrogel was foamed between two 6" × 6" chrome plates in a Carver press at 130° C. for 55 seconds.

The foamed sheet after removal from the press measured ⅛" × 6" × 6". It displayed excellent tear strength, toughness and flexibility.

EXAMPLE 54

A solution of 20 g. of Bakelite ® QYAC-10 (polyvinyl chloride homopolymer) in 40 g. of cyclohexanone was prepared by stirring at 50° C. The solution was cooled to 30° C. and 64 g. of methylene chloride was added with stirring followed by 80 g. of P-1700 polysulfone. Excess water was then added and kneaded to a non-sticky hydrogel dough. The dough was foamed in a Carver press for 2 minutes at 180° C. The resultant foamed sheet had a high gloss surface and was very rigid.

Although the invention has been described in its preferred form with a certain amount of particularity, it is understood that the present disclosure has been made only by way of example and that numerous changes can be made without departing from the spirit and scope of the invention.

What is claimed is:

1. A composition suitable for fabricating low density foamed articles consisting essentially of a non-tacky hydrogel dough obtained by mixing:
   (a) at least one normally solid thermoplastic polyarylene polyether polysulfone resin with about 25 to about 80 parts per hundred parts by weight of said resin of a normally liquid organic solvent having of solubility parameter, $\delta$, within about (1.3 calories/cc.)$^{\frac{1}{2}}$ of that of said resin or a mixture of normally liquid organic solvents having an average solubility parameter, $\delta$, within about (1.3 calories/cc.)$^{\frac{1}{2}}$ of that of said resin; and
   (b) at least one part by weight of water per 100 parts by weight of said resin completely until a white, homogeneous mixture of polyarylene polyether polysulfone resin, solvent, and water is obtained.

2. The hydrogel dough claimed in claim 1 wherein the solvent is methylene chloride.

3. The hydrogel dough claimed in claim 1 wherein the solvent is 1,1,2-trichloroethane.

4. The hydrogel dough claimed in claim 1 wherein the resin is a polyarylene polyether polysulfone containing repeating units having the formula:

wherein Ar is a divalent aromatic radical containing at least one unit having the structure:

wherein Y is oxygen, sulfur or the radical residuum of an aromatic diol.

5. The hydrogel dough claimed in claim 4 wherein the polyarylene polyether polysulfone repeating units have the formula:

wherein $n$ is 10 to about 500.

6. The hydrogel dough claimed in claim 1 wherein the solvent is a mixture of solvents.

7. The hydrogel dough claimed in claim 6 wherein the mixture of solvents is a mixture of ethanol and methylene chloride.

8. The hydrogel dough claimed in claim 6 wherein the mixture of solvents is a mixture of 1,1,1-trichloroethane and ethanol.

* * * * *